March 15, 1966  W. WICKERSHAM  3,240,304

MAGNETIC OVERLOAD CLUTCH DEVICE

Filed Aug. 23, 1963

INVENTOR.
WILFRED H. WICKERSHAM
BY *Herbert L. Davis*
ATTORNEY 3,240,304
MAGNETIC OVERLOAD CLUTCH DEVICE
Wilfred Wickersham, Upper Saddle River, N.J., assignor to The Bendix Corporation, Teterboro, N.J., a corporation of Delaware
Filed Aug. 23, 1963, Ser. No. 304,141
12 Claims. (Cl. 192—56)

The invention relates to an improved magnetic overload clutch device and more particularly to a novel coupling means to provide a positive coupling between a driving member and a driven member until a predetermined load is exceeded, and which coupling means is so arranged that, when the predetermined load is exceeded, the coupling members completely disengage in opposition to the biasing force of a suitable magnetic means and remain disengaged under the biasing force of another magnetic means until reset for resumption of normal operation.

Heretofore, overload clutch devices have utilized shear pins or slip clutches in which the replacement of the shear pins have required disassembly and the use of suitable tools while such slip clutches, as shown for example, in U.S. Patent No. 2,259,824, granted October 21, 1941, to Vander B. Lowder, are often complex, spring loaded and bulky requiring maintenance inasmuch as such spring loaded devices may be susceptible to spring breakage from crystalization or other causes; while the present invention relates to an overload coupling device providing a positive toothed coupling dependent on magnetic fields acting in opposition so as to maintain the coupling device in engaging and disengaging relation to afford equipment protection during periods of overload, while permitting restoration of operation by resetting when the overload fault has been cleared.

An object of the invention is to provide a novel combination of magnetic fields cooperatively arranged in relation to suitable driving and driven coupling members so as to maintain the same in either a direct driving toothed engagement or in a disengaged relation.

Another object of the invention is to provide a novel magnetic overload clutch device in which a torsional load may be transmitted from a driving member to a driven member by means of meshing teeth of each member and in which relative axial motion of the members may be effective to disengage the teeth while the teeth may be normally held in mesh by an axial force developed by a magnetic means carried by the members and in which the coupling members may be disengaged and locked in the disengaging relation by means of another magnetic means acting on one of the coupling members in opposition to the first-mentioned magnetic means.

Another object of the invention is to provide a magnetic load clutch device in which the maximum load capability is a function of the magnetic flux and the design of the meshing teeth of the coupling members.

Another object of the invention is to provide a magnetic overload clutch device so arranged as to "lock up" when the overload rating is exceeded so as to keep the coupling members disengaged indefinitely until reset in engaging coupling relation.

Another object of the invention is to provide a magnetic overload clutch device in which, upon the torque rating of the device being exceeded, an axial force component developed by the angle of the sides of the engaging teeth of the coupling members becomes greater than an axial magnetic force of a magnetic means acting to keep the teeth of the coupling members in engaging relation, and as a result, the coupling members separate axially with a snap action under an opposing biasing force of a second magnetic means so as to disengage while a locking of the coupling members in the disengaged relation is effected by the magnetic force of the second magnetic means so that the coupling members may not reengage under the biasing force of the first-mentioned magnetic means.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings:
FIGURE 1 is a top view of a magnetic clutch device embodying the invention and operatively connected between a driving motor and a driven mechanism with certain parts of the clutch device broken away so as to better illustrate the slot and pin arrangement thereof. While one member has arbitrarily been shown as the driven member, this is immaterial since the clutch will function equally well if the driving and driven members are transposed.

Figure 1:
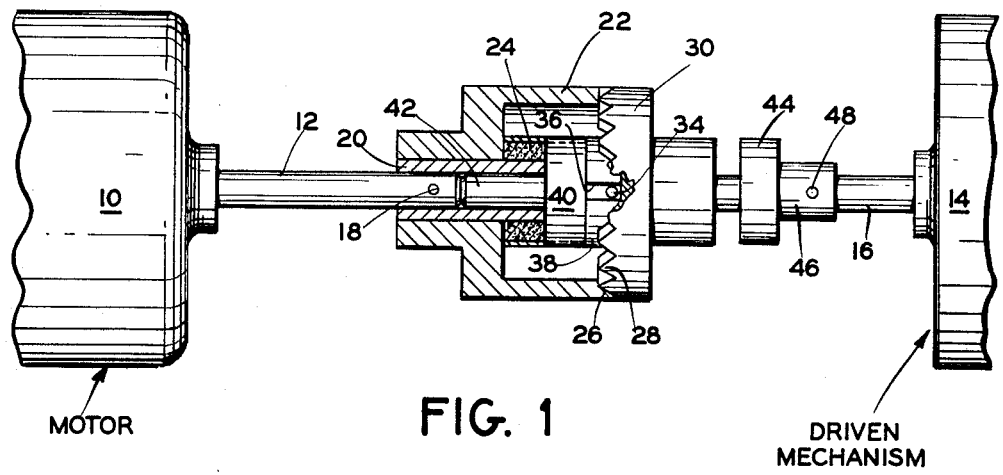

Referring to the drawing of FIGURE 1, there is indicated generally by the numeral 10 a motor having an output driving shaft 12 and a driven mechanism 14 having an input driven shaft 16. The driving shaft 12 has fastened at the free end thereof by a pin 18 a tubular member 20 and a driving cup-shaped coupling member 22 mounted on the tubular member 20. Further, fastened to the free end of the tubular member 20 is an annular permanent magnet 24 concentrically positioned within the cup-shaped coupling member 22. The tubular member 20 and the cup-shaped coupling member 22 are formed of a suitable ferro-magnetic material.

Figure 2:
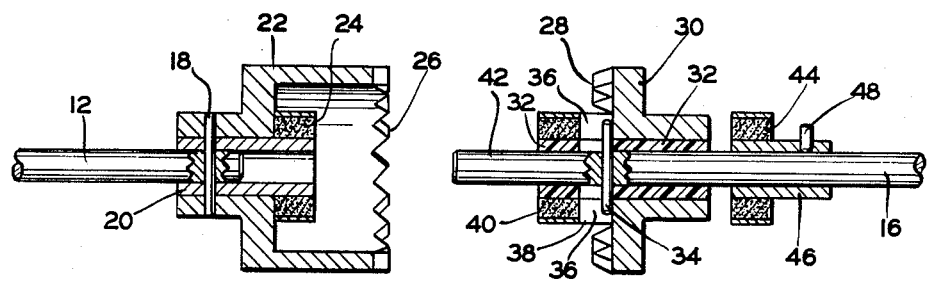
FIGURE 2 is a side sectional view of the magnetic overload clutch device of FIGURE 1 with the driving and driven members shown in separated relation so as to better illustrate the operative parts thereof.

The cup-shaped driving member 22 has a series of suitable teeth 26 provided in the outer edge thereof and arranged in cooperative engagement with corresponding teeth 28 provided on a driven member 30 also formed of a suitable ferro-magnetic material. The driven member 30, as shown in FIGURE 2, is affixed to an annular bushing 32 formed of a suitable self-lubricant nonmagnetic material having a low coefficient of friction such as "oilete," bronze or polytetrafluoroethylene resin or "Teflon," slidably mounted on the driven shaft 16.

Freedom of axial motion of the driven member 30 on the shaft 16 provided by the bushing 32 is limited in one sense by a pin 34 secured in the driven shaft 16 and projecting into suitable slots 36 provided in a hub portion 38 of the driven coupling member 30. The hub portion 38 has mounted at the free end thereof and secured to the bushing 32 an annular permanent magnet 40 arranged in cooperative relation with the magnet 24 affixed to the free end of the tubular member 20 in the cup-shaped driving member 22 so as to bias the teeth 28 of the driven member 30 into engaging relation with the teeth 26 of the driving member 22 with the free end 42 of the driven shaft 16 being positioned within the tubular member 20 affixed to the driving shaft 12.

While the pin 34 cooperates in the slot 36 so as to limit the axial motion of the driven coupling member 30 in a one sense with the permanent magnet 24 being operatively positioned in adjacent relation with the permanent magnet 40, as shown in FIGURE 1, the pin 34 is also effective in the slot 36 to limit the axial motion of the driven coupling member 30 in an opposite sense with the driven coupling member 30 being positioned in disengaging relation with the driving coupling member 22.

In order to lock the driven coupling member 30 in the aforesaid disengaging relation to the driving coupling member 22, there is provided a third annular permanent magnet 44 affixed to a bushing 46 which in turn is secured to the driven shaft 16 by a suitable bolt 48. The permanent magnet 44 acts on the ferro-magnetic material of the driven member 30 in opposition to the magnetic force of the magnets 24 and 40 so as to hold the coupling member 30 in the disengaged relation.

Operation

In the operation of the magnetic overload clutch device shown in FIGURES 1 and 2, a torsional load applied by the driven mechanism 14 is transmitted from the driving member 22 to the driven member 30 by means of the meshing teeth 26 and 28 on said respective members. While either or both of these members 22 and 30 may have provision for axial motion, so that the teeth 26 and 28 may be disengaged, in the form of the invention illustrated herein, the driven member 30 is shown as axially movable on the shaft 16 so that the teeth 26 and 28 may be disengaged.

The teeth 26 and 28 are normally held in mesh by an axial force developed by the magnets 24 and 40 fastened to the respective driving and driven members 22 and 30. Moreover upon the coupling members 22 and 30 becoming disengaged, the driven member 30 is locked in the disengaging relation by means of the permanent magnet 44 carried by the shaft 16, as shown in FIGURE 2.

Freedom of axial motion of the driven coupling member 30 on the shaft 16 may be effected by a bushing 32 of a suitable plastic material such as polytetrafluoroethylene resin or "Teflon" which permits the sliding movement of the driven coupling member 30 on the shaft 16. Moreover, it will be seen that, upon a torsional load being so applied, the axial force component developed by the angle of the sides of the teeth 26 and 28 becomes greater than the axial magnetic force applied by the permanent magnets 24 and 40 acting to keep the teeth of the two coupling members engaged, whereupon the coupling members 22 and 30 axially separate to effect a disengaging relation with a snap action, since the magnetic force applied by the two permanent magnets 24 and 40 will progressively decrease as the air gap between the two magnets increases with the separation of the coupling members while the magnetic force of the holding magnet 44 acting in opposition thereto will increase with such axial motion in the disengaging direction.

Moreover, the permanent magnet 44 acts to hold the driven coupling member 30 in the disengaging relation so that the sliding driven member 30 does not tend to reengage under the magnetic force of the magnets 24 and 40 upon the applied load decreasing.

It will be seen from the drawings of FIGURES 1 and 2 that the axial thrust component of the transmitted torque is a function of the angle of the sides of the teeth 26 and 28 of the two coupling members 22 and 30. The angle of the teeth may be so selected and the forces of the magnetic flux may be so controlled by the selected size and spacing of the magnets 24 and 40 carried by the driving and driven members 22 and 30, respectively, as to provide suitable means for effectively establishing the rate or overload point of the magnetic overload clutch device.

Further, while the pin 34 operates within the slots 36 so as to limit the extent of the axial movement of the driven coupling member 30 on the driven shaft 16, the pin 34 also operates within the slot 36, as probably best shown in FIGURE 1, so that angular motion of the driven coupling member 30 relative to the driven shaft 16 is prevented by the pin 34 in the arrangement thereof within the slot 36 in the hub portion 38 of the coupling member 30. For greater load capacity a suitable spline arrangement between the driven coupling member 30 and the shaft 16 may be effected.

Modified form of the invention

Figure 3:
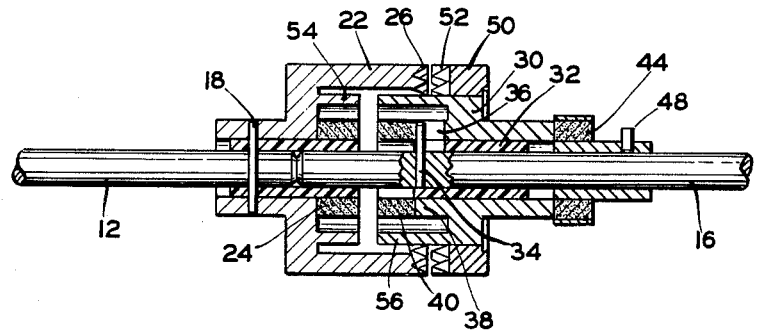
FIGURE 3 is a side sectional view of a modified form of the invention with the driving and driven members shown in disengaging relation.

A modified form of the invention is shown in FIGURE 3 in which corresponding numerals indicate corresponding parts to those shown in FIGURES 1 and 2. In the form of the invention shown in FIGURES 1 and 2, some difficulty has been encountered in the provision of the electromagnetic flux path through the teeth 26 and 28 of the coupling members 22 and 30 in that the magnetic flux acting through the teeth tends to render the separation of the coupling elements 22 and 30 "sticky" so as to adversely effect the accuracy of the overload value at which the overload clutch device will disengage.

In order to improve the accuracy of the overload clutch device, it has been found that by providing at least one of the coupling members with coupling teeth of a suitable nonmagnetic material such as copper, bronze, or brass, as indicated in the form of the invention illustrated in FIGURE 3, this undesirable "sticky" effect may be avoided.

In the modified form of the overload clutch device illustrated in FIGURE 3, there is provided an annular member 50 formed of a suitable nonmagnetic material such as copper, bronze, or brass and having teeth 52 operatively engaging teeth 26 of the driving coupling member 22.

The member 50 is suitably secured to the periphery of the driven member 30, as shown in FIGURE 3, and which member 30 may be formed of a suitable ferromagnetic material, as well as the driving member 22.

Within the driving member 22, there is further provided an annular tubular member 54 projecting axially therein and arranged to cooperate with a second annular tubular member 56 projecting axially from the driving member 30 into the driven member 22. The tubular members 54 and 56 are formed of a suitable ferro-magnetic material and provide the return path for the flux from the permanent magnets 24 and 40 which are attached within the respective coupling members 22 and 30 in much the same manner as in the form of the invention shown in FIGURES 1 and 2.

Through the provision of the separate electromagnetic flux paths through the members 54 and 56, the flux from the magnets 24 and 40 does pass through the teeth 26 and 52 so that the teeth in disengaging do not tend to stick as in the case of the form of the invention of FIGURES 1 and 2, and the value of the overload at which the clutch device will disengage may be predetermined with greater accuracy.

It will be seen from the foregoing that there has been provided a simple magnetic clutch device which has a maximum load capability which may be many times that of the magnetic device along because of the direct drive effected through the engaged teeth 26 and 28 of FIGURES 1 and 2 and 26 and 52 of FIGURE 3 on the driving and driven members 22 and 30.

Thus, the maximum load capability of the clutch device is a function of the magnetic flux provided by the permanent magnets 24 and 40, and the design of the meshing teeth 26 and 28 of FIGURES 1 and 2 or teeth 26 and 52 of FIGURE 3, of the driving and driven coupling members 22 and 30.

Furthermore, the invention provides a clutch device which may be arranged so as to readily "lock up" through the action of the holding magnet 44 when the overload rate thereof is exceeded thereby keeping the coupling members 22 and 30 in a disengaged relation indefinitely until the device has been reset by manually actuating the coupling member 30 against the biasing force of the holding magnet 44 into coupling relation with the driving member 22 when normal operation is desired. Likewise the holding magnet 44 can be replaced by an electromagnetic coil or solenoid for applications requiring remote reset capability.

While two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. The combination comprising driving and driven members, releasable means for engaing the members in coupling relation, magnetic means for holding the driving and driven members in the engaging coupling relation, said releasable means being effective for disengaging the said driving and driven members upon a predetermined overload on the driven member exceeding the biasing force of the first-mentioned magnetic means, and other magnetic means for maintaining the driving and driven members in said disengaging relation.

2. The combination comprising driving and driven members, releasable means for engaging the members in coupling relation, magnetic means for holding the driving and driven members in the engaging coupling relation, said releasable means being effective for disengaging the driving and driven members upon an overload on the driven member exceeding the biasing force of the first-mentioned magnetic means, other magnetic means acting in opposition to said first-mentioned magnetic means for rendering said releasable means effective to disengage said driving and driven members with a snap action under said overload, and said other magnetic means being thereupon effective to hold the driving and driven members in said disengaged relation.

3. The combination comprising driving and driven members, releasable tooth means for engaging the said members in direct driving relationship, a primary magnetic means for normally holding the said driving and driven members in said engaging relation, said releasable tooth means being arranged for disengaging said driving and driven members in opposition to said primary magnetic means upon an overload on said driven member, and an auxiliary magnetic means acting in opposition to said primary magnetic means for holding one of said members in said disengaging relationship from said other member.

4. The combination comprising a driving shaft and a driving member mounted thereon, a driven shaft and a driven member mounted thereon, releasable tooth means for engaging the members in direct driving relation, a primary magnetic means carried by said driving and driven members to normally hold the driving and driven members in said engaging relationship, said releasable tooth means being arranged to release said driving and driven members in opposition to said primary magnetic means upon a predetermined overload on the driven member, and auxiliary magnetic means mounted on said driven shaft and acting on said driven member in opposition to said primary magnetic means to normally hold the driven member in disengaging relation to said driving member.

5. The combination comprising a driving shaft having a driving member mounted thereon, a driven shaft having a driven member mounted thereon, releasable tooth means for engaging the members in direct driving relationship, a primary magnetic means mounted on said driving and driven members to normally hold the driving and driven members in engaging relationship, said releasable tooth means being arranged for disengaging the said driving and driven members in opposition to said primary magnetic means upon a predetermined overload on the driven member, auxiliary magnetic means mounted on said driven shaft and acting on one end of said driven member in opposition to the primary magnetic means, and said driven member being manually operable in opposition to said auxiliary magnetic means to return the driven member to a re-engaging relationship with the driving member.

6. The combination comprising a driving shaft having a driving member mounted thereon, a driven shaft having a driven member mounted thereon, releasable tooth means for engaging the said members in direct driving relationship, a primary magnetic means mounted on at least one of said members for normally holding the said driving and driven members in said engaging relationship, said releasable tooth means including means for disengaging the said driving and driven members upon a predetermined overload on the driven member, auxiliary magnetic means for holding the said driven member in an inoperable position relative to said driving member and said auxiliary magnetic means acting in opposition to said primary magnetic means.

7. The combination comprising driving shaft and a driven shaft, a driving member affixed to said driving shaft and having teeth formed therein, a driven member slidably mounted on said driven shaft and having teeth formed therein for engaging the teeth of said driving member, primary magnetic means carried by said members for normally holding the teeth of said driving and driven members in engaging relation, and said teeth of the driving and driven members being arranged to effect axial movement of said driven member relative to said driving member for disengaging said driven member from the driving member in opposition to said magnetic means upon a predetermined overload being applied to the driven member, including an auxiliary magnetic means carried by said driven shaft for biasing the driven member in opposition to said primary magnetic means and for holding the driven member in said disengaging relationship.

8. An overload clutch device comprising driving and driven members, releasable tooth means for engaging said members in direct driving relationship, a primary magnet operatively connected to one end of one of said members and acting on said other member in such a manner as to normally cause said releasable tooth means to hold said driving and driven members in said engaging relationship, an auxiliary magnet acting on another end of said one member in opposition to said primary magnet, said releasable tooth means being arranged to disengage said driving and driven members in opposition to said primary magnet upon a predetermined overload on the driven member, and said auxiliary magnet being arranged to hold said driven member in said disengaging relationship in opposition to said primary magnet.

9. An overload clutch device comprising driving and driven members, releasable tooth means engaging said members in direct driving relationship, a shaft having one of said members slidably mounted thereon in driving relationship, a primary magnet operatively connected to one of said members and adapted to act on the other of said members so as to hold the driving and driven members in engaging relationship through said releasable tooth means, and an auxiliary magnet acting on said one member in opposition to said primary magnet whereby upon axial movement of said slidably mounted one member relative to the other member the said one member is held by said auxiliary magnet against effecting clutch engagement through said releasable tooth means with said other member.

10. The combination comprising a drive shaft having a driving member mounted thereon, a driven shaft having a driven member mounted thereon, one of said members having a cup shape, and each of said members including teeth for engaging the members in direct driving relationship, each of said members including a magnet mounted thereon for biasing the driving and driven members into said engaging relationship, a first tubular member projecting axially from the driving member in concentric relation with the magnet mounted on said driving member, a second tubular member projecting axially from the driven member in concentric relation with the magnet mounted on said driven member, said tubular members being formed of a ferromagnetic material and cooperating one with the other for providing a return path for magnetic flux from the magnets mounted on the driving and driven members, the teeth of at least one of said members, being formed of a nonmagnetic material and so arranged in relation to said tubular members that the magnetic flux may be effectively shunted from said teeth and through the return path provided by said tubular members, and said teeth of said members in said engaging relation being arranged for disengaging said driving and driven members in opposition to the magnetic forces asserted by said magnetics upon a predetermined overload on the driven member.

11. The combination comprising a driving shaft having a driving member mounted thereon, a driven shaft having a driven member mounted thereon, one of said members having a cup shape, and each of said members including teeth for engaging the members in direct driving relationship, a magnet mounted on each of said members for biasing the driving and driven members into engaging relationship through said teeth, a first tubular member projecting axially from the driving member in concentric relation with the magnet mounted on said driving member, a second tubular member projecting axially from the driven member in concentric relation with the magnet mounted on said driven member, said tubular members being formed of a ferror-magnetic material and cooperating one with the other for providing a return path for magnetic flux from the magnets mounted on the driving and driven members, the teeth of at least one of said members being formed of a nonmagnetic material and so arranged in relation to said tubular members that the magnetic flux may be effectively diverted from said teeth and through the return path provided by said tubular members, and said teeth of said members in said engaging relation being arranged for disengaging said driving and driven members in opposition to the magnetic forces asserted by said magnets upon a predetermined overload on the driven member, and an auxiliary magnet acting in opposition to said first-mentioned magnets for holding said last-mentioned member in said disengaging relationship.

12. An overload clutch device comprising driving and driven shafts, a driving member affixed to said driving shaft and having teeth formed therein, a driven member slidably mounted on said driven shaft and having teeth formed therein for engaging the teeth in said driving member, for magnetic means carried by at least one of said members for biasing said driven member axially on said driven shaft so as to cause the teeth formed in said driven member to engage the teeth in said drivng member, an element formed of a ferro-magnetic material carried by at least one of said members for cooperating with the other of said members so as to provide a return path for magnetic flux from said magnetic means, said element being so arranged as to shunt the magnetic flux from the teeth of said driving and driven members, the teeth of at least one of said members being formed of a nonmagnetic material, and the teeth of the driving and driven members being so arranged so as to effect an axial movement of said driven member relative to said driving member in opposition to the magnetic forces applied by said magnetic means for disengaging said driving member from the driven member upon an overload being applied to the driven member.

References Cited by the Examiner
UNITED STATES PATENTS

| 2,859,846 | 11/1958 | Shappell | 192—56 |
| 2,929,477 | 3/1960 | Rodriquez et al. | 192—84 |
| 2,962,143 | 11/1960 | Heinemann | 192 |

DON A. WAITE, *Primary Examiner.*

DAVID J. WILLIAMOWSKY, *Examiner.*